(12) United States Patent
Jain et al.

(10) Patent No.: US 9,489,325 B2
(45) Date of Patent: Nov. 8, 2016

(54) METHOD AND A SYSTEM FOR POLLING AND PROCESSING DATA

(76) Inventors: Sandeep Jain, Palo Alto, CA (US); Prakash Chandra Tiwary, Gurgaon (IN)

( * ) Notice: Subject to any disclaimer, the term of this patent is extended or adjusted under 35 U.S.C. 154(b) by 480 days.

(21) Appl. No.: 13/457,492

(22) Filed: Apr. 27, 2012

(65) Prior Publication Data

US 2013/0117482 A1    May 9, 2013

Related U.S. Application Data

(60) Provisional application No. 61/480,291, filed on Apr. 28, 2011.

(51) Int. Cl.
| | |
|---|---|
| *G06F 11/00* | (2006.01) |
| *G06F 13/22* | (2006.01) |
| *G06F 17/30* | (2006.01) |
| *G06F 11/20* | (2006.01) |

(52) U.S. Cl.
CPC ......... *G06F 13/22* (2013.01); *G06F 17/30008* (2013.01); *G06F 17/30575* (2013.01); *G06F 11/2082* (2013.01)

(58) Field of Classification Search
CPC ........... G06F 11/1412; G06F 11/1658; G06F 11/2082; G06F 17/30286; G06F 17/30348; G06F 17/30368; G06F 11/30371; G06F 17/30575; G06F 17/30578
USPC ........... 714/15; 707/610, 615, 616, 618, 641
See application file for complete search history.

(56) References Cited

U.S. PATENT DOCUMENTS

| | | | |
|---|---|---|---|
| 7,080,104 B2 * | 7/2006 | Ring et al. | |
| 7,111,189 B1 * | 9/2006 | Sicola et al. | 714/6.21 |
| 8,156,074 B1 * | 4/2012 | Multer et al. | 707/610 |
| 8,818,938 B2 * | 8/2014 | Maya et al. | 707/610 |
| 9,298,762 B2 * | 3/2016 | Smarr | G06F 17/30345 |
| 2003/0130984 A1 * | 7/2003 | Quinlan et al. | 707/1 |
| 2005/0027755 A1 * | 2/2005 | Shah | G06F 3/0605 |
| 2005/0256907 A1 * | 11/2005 | Novik | G06F 17/30575 |
| 2006/0242444 A1 * | 10/2006 | Novik | G06F 17/30215 713/400 |
| 2010/0191884 A1 * | 7/2010 | Holenstein et al. | 710/200 |
| 2011/0161284 A1 * | 6/2011 | Tewari | G06F 17/30371 707/609 |
| 2012/0011399 A1 * | 1/2012 | Park | G06F 11/1443 714/16 |
| 2012/0130953 A1 * | 5/2012 | Hind et al. | 707/638 |
| 2013/0117226 A1 * | 5/2013 | Jain et al. | 707/625 |
| 2013/0117229 A1 * | 5/2013 | Jain et al. | 707/634 |
| 2014/0032492 A1 * | 1/2014 | Ziemann et al. | 707/610 |
| 2014/0068328 A1 * | 3/2014 | Jain | G06F 11/1471 714/15 |
| 2015/0082100 A1 * | 3/2015 | Jain | G06F 17/30174 714/48 |
| 2015/0379103 A1 * | 12/2015 | Prophete | H04L 67/1095 707/621 |

* cited by examiner

*Primary Examiner* — Marc Duncan
(74) *Attorney, Agent, or Firm* — Barry Choobin; Patent 360 LLC

(57) ABSTRACT

The embodiments herein provide a method and system for polling and processing data. The method comprises computing a maximum time from a source after a last update time, waiting for a preset time to ensure that all transactions with respect to a change in a data is completed, querying for a plurality of changes after an elapse of the preset waiting time since the last update time and up to the maximum time, generating a time window, collecting a list of changes occurred within the generated time window, sending the collected list of changes for processing; and updating the processed data at the destination. The time window comprises a time interval between the last update time and the maximum time.

11 Claims, 3 Drawing Sheets

METHOD AND A SYSTEM FOR POLLING AND PROCESSING DATA

CROSS-REFERENCE TO RELATED APPLICATION

This application claims the priority under 35 USC 119(e) of U.S. Provisional Application Ser. No. 61/480,291 which is included by reference herein.

BACKGROUND

1. Technical Field

The embodiments herein generally relate to a process of data integration and particularly relate to a method of polling and processing data in a data integration process. The embodiments herein more particularly relate to a method and system for polling and processing data in real time.

2. Description of the Related Art

A data integration process involves combining the data residing in different sources and providing the users with a unified view of the data. In this process, the data is frequently fetched (polled) from a source system to achieve the changes in a destination system. The data integration process becomes significant in a variety of situations such as commercial and scientific fields. In commercial field, the data integration plays very important role in merging the databases of two similar companies. In a similar way, there is a need to provide an integration among the data in scientific field while combining the research results from different repositories.

In a data integration process, a polling of the data from source system involves reading the data from source system and writing the data in a destination system after reading. The writing of the data to the destination system is called a processing of the data. A Polling frequency means how frequently the data is read from the source. A time difference between the two successive polling operations is referred as a polling interval. The polling of data can be a data of same entity or different entities or new entity.

One of the issues in polling and processing the data is the possibility of missing some changes while reading the change logs concurrently with users making the changes actively and hence writing the logs. For example consider a case in which a user U1 makes the changes at time T1 and user u2 makes the changes at time T2 (T2>T1). Due to various reasons such as process scheduling, database operations etc., it can happen that the changes done by the user U1 are actually committed after the changes done by the user U2. When the changes are committed by the user U2 at a time CA and the changes are committed by the user U1 at a time CB, a polling of the changes results in reading the changes committed at a time interval between CA and CB and as a result, only the changes done by the user U2 are fetched and not the changes done by the user U1 in that polling process. At the same time it will search for the time stamp of T2 in the history. In the next poll cycle only the changes made after T2 is fetched thereby missing the changes made by the user U1. This type of problem is called a passing in night problem.

A standard polling solution does not deal with a passing in night problem.

Hence, there is a need for a method for polling and processing a data in real time. There is also a need for a method to address a passing in night problem in data integration.

The abovementioned shortcomings, disadvantages and problems are addressed herein and which will be understood by reading and studying the following specification.

OBJECTS OF THE EMBODIMENTS

The primary object of the embodiments herein is to provide a method and a system for polling and processing a data.

Another object of the embodiments herein is to provide a method and a system for polling and processing a data in real time.

Yet another object of the embodiments herein is to provide a method and a system for polling and processing a data to provide a solution for the passing in night problem.

Yet another object of the embodiments herein is to provide a method and a system for polling and processing a data to provide a way to ensure that all the transitions happened within a time window are read and processed.

Yet another object of the embodiments herein is to provide a method and a system for polling and processing a data to synchronize a data from a source system to a destination system to easily create the multi-point interconnections during a synchronization process.

Yet another object of the embodiments herein is to provide a method and a system for polling and processing a data to synchronize a data from a source system to a destination system to use the established connectors to connect the appropriate systems during a synchronization process.

Yet another object of the embodiments herein is to provide a method and a system for polling and processing a data to synchronizing a data from a source system to a destination system to create and manage custom mappings.

Yet another object of the embodiments herein is to provide a method and a system for polling and processing a data to synchronize a data from a source system to a destination system to provide a built in support for a recovery management, conflict detection and management and a failure management.

Yet another object of the embodiments herein is to provide a method and a system for polling and processing a data to provide a communication in real-time.

Yet another object of the embodiments herein is to provide a method and a system for polling and processing a data to synchronize a data from a source system to a destination system to provide a support for a pre and post commit event handling.

Yet another object of embodiments herein is to provide a method and a system for polling and processing a data to synchronize a data from a source system to a destination system to provide an extensible and easy to integrate/support additional tools/systems.

Yet another object of the embodiments herein is to provide a method and a system for polling and processing a data to synchronize a data from a source system to a destination system to provide a simple installation, a support and a maintenance of a synchronization process.

Yet another object of the embodiments herein is to provide a method and a system for polling and processing a data to synchronize a data from a source system to a destination system to make use of a hub and spoke topology to decouple a source and a destination by inserting a central component acting as an active mediator.

Yet another object of the embodiments herein is to provide a method and a system for polling and processing a data to synchronize a data from a source system to a destination system to use a hub and spoke technology to provide a flexibility of a system extension.

Yet another object of the embodiments herein is to provide method and a system for polling and processing a data using both an event based trigger and a scheduler based trigger to synchronize a data from a source to a destination.

These and other objects and advantages of the embodiment herein will become readily apparent from the following summary and the detailed description taken in conjunction with the accompanying drawings.

SUMMARY

The various embodiments herein provide a method and a system for polling and processing data. The method comprises computing a maximum time from a source after a last update time, waiting for a preset time to ensure that all transactions with respect to a change in a data is completed, querying for a plurality of changes after an elapse of the preset waiting time since the last update time and up to the maximum time, generating a time window, collecting a list of changes occurred within the generated time window, sending the collected list of changes for processing; and updating the processed data at the destination. The time window comprises a time interval between the last update time and the maximum time.

According to an embodiment herein, the waiting period is a minimum period of time required between two successive polling processes and the preset waiting period is selected such that all transactions which are in flight at a time of a first query are completed.

According to embodiment herein, the method further comprises using an event based trigger and a scheduler based trigger to poll and synchronize a data from a source to a destination.

When a poll is active at the time of a scheduler based trigger, then the scheduler based trigger is skipped. When an event based trigger is received and no poll is active, then the event based trigger kicks off the polling process. When the poll is active, the event based trigger sets a flag indicating a need to repoll at the end of a poll. At the end of a poll, the repoll flag is checked for. When the repoll flag is set, then another poll cycle is immediately kicked off.

According to an embodiment herein, the system for polling and processing a data from a source to a destination comprises a connector framework, a processing manager, a mapping manager, a recovery manager, a conflict manager, a failure manager.

According to an embodiment herein, the connector framework comprises two connector modules, a polling module and an adapter module.

According to an embodiment herein, the processing manager processes a poll event using a processing engine.

According to an embodiment herein, the mapping manager maps a plurality of fields of the source to corresponding fields of a destination.

According to an embodiment herein, the recovery manager automatically recovers a data in case of an unexpected failure.

According to an embodiment herein, the conflict manager solves one or more conflicts occurring during a synchronization process. A conflict is occurred, when a current value of any field of the destination doesn't match with a last value of a field of the source.

According to an embodiment herein, the failure manager controls a failed event during a synchronization process. The failed event is the one in which a change in a data is not written to the destination.

According to an embodiment herein, the polling module reads the plurality of changes from the source and the adapter module to write the plurality of changes at the destination.

According to an embodiment herein, the processing engine is any one of a Java Process Definition Language (JBOSS JPDL), Drools and an Apache Orchestration Director Engine (ODE).

According to an embodiment herein, the processing manager reports a successful synchronization process back to the source after a completion of a successful synchronization process.

According to an embodiment herein, the processing manager passes a control to a failure manager after an unsuccessful synchronization process.

According to an embodiment herein, the recovery manager controls the adapter module and the polling module.

According to an embodiment herein, the conflict manager detects a conflict to activate an integration model to resolve the conflict automatically. The integration model is at least one of a master/slave model, a partitioned ownership model, a dynamic ownership model, a peer to peer model and a custom configuration model. In the master/slave model, the entity is created at the master and one or more read only copies of the entity are created in slave system. In the partitioned ownership model, one or more fields of the entity are created at one or more systems. An ownership of the entity changes dynamically in the dynamic ownership model. In the peer to peer to model, changes are made to the entities from a plurality of sites to carry out a conflict detection process and a conflict resolving process. In the custom configuration model, a replication model is customized.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
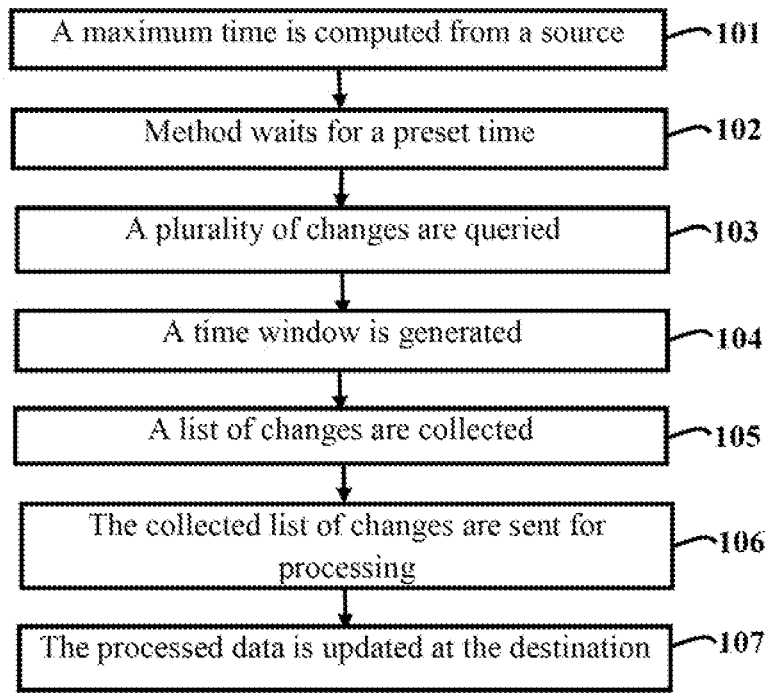
FIG. 1 illustrates a flowchart explaining a method for polling and processing a data from a source system to a destination system, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method and a system for polling and processing data. The method comprises computing a maximum time from a source after a last update time, waiting for a preset to ensure that all transactions with respect to a change in a data is completed, querying for a plurality of changes after an elapse of the preset waiting time since the last update time and up to the maximum time, generating a time window, collecting a list of changes occurred within the generated time window, sending the collected list of changes for processing; and updating the processed data at the destination. The time window comprises a time interval between the last update time and the maximum time.

According to an embodiment herein, the waiting period is a minimum period of time required between two successive polling processes and the preset waiting period is selected such that all transactions which are in flight at a time of a first query are completed.

According to embodiment herein, the method further comprises using an event based trigger and a scheduler based trigger to poll and synchronize a data from a source to a destination.

When a poll is active at the time of a scheduler based trigger, then the scheduler based trigger is skipped. When an event based trigger is received and no poll is active, then the event based trigger kicks off the polling process. When the poll is active, the event based trigger sets a flag indicating a need to repoll at the end of a poll. At the end of a poll, the repoll flag is checked for. When the repoll flag is set, then another poll cycle is immediately kicked off.

According to an embodiment herein, the system for synchronizing a data from a source to a destination comprises a connector framework, a processing manager, a mapping manager, a recovery manager, a conflict manager, a failure manager.

According to an embodiment herein, the connector framework comprises two connector modules, a polling module and an adapter module.

According to an embodiment herein, the processing manager processes a poll event using a processing engine.

According to an embodiment herein, the mapping manager maps a plurality of fields of the source to the corresponding fields of a destination.

According to an embodiment herein, the recovery manager automatically recovers a data in case of an unexpected failure.

According to an embodiment herein, the conflict manager solves one or more conflicts occurring during a synchronization process. A conflict is occurred, when a current value of any field of the destination doesn't match with a last value of a field of the source.

According to an embodiment herein, the failure manager controls a failed event during a synchronization process. The failed event is the one in which a change in a data is not written to the destination.

According to an embodiment herein, the polling module reads the plurality of changes from the source and the adapter module to write the plurality of changes at the destination.

According to an embodiment herein, the processing engine is any one of a Java Process Definition Language (JBOSS JPDL), Drools and an Apache Orchestration Director Engine (ODE).

According to an embodiment herein, the processing manager reports a successful synchronization process back to the source after a completion of a successful synchronization process.

According to an embodiment herein, the processing manager passes a control to a failure manager after an unsuccessful synchronization process.

According to an embodiment herein, the recovery manager controls the adapter module and the polling module.

According to an embodiment herein, the conflict manager detects a conflict to activate an integration model to resolve the conflict automatically. The integration model is at least one of a master/slave model, a partitioned ownership model, a dynamic ownership model, a peer to peer model and a custom configuration model. In the master/slave model, the entity is created at the master and one or more read only copies of the entity are created in slave system. In the partitioned ownership model, one or more fields of the entity are created at one or more systems. An ownership of the entity changes dynamically in the dynamic ownership model. In the peer to to model, changes are made to the entities from a plurality of sites to carry out a conflict detection process and a conflict resolving process. In the custom configuration model, a replication model is customized.

Consider a case in which the concurrent updates are generated for a same entity and at a same time. Consider a following scenario: User U1 starts finalizing the changes at time T1 and user U2 starts finalizing their changes at time T2 (T2>T1). Due to the various reasons such as process scheduling, database operation etc., It can happen that changes done by the user U1 are actually committed after the changes made by the user U2. When changes done the user U2 are committed at time CA and the changes done by the user U1 are committed at time CB. When a polling process is done to reads the changes committed at a time between CA and CB, the changes done by the user U2 are only fetched and the changes done by the user U1 is not fetched in that poll. At the same time, the polling process a history time stamp of T2. In next poll cycle only the changes made after T2 are polled and the changes made by U1 are lost.

According to embodiments herein, a method is provided to solve this problem by reading the data in two steps. In the first step, a maximum time stamp is computed from the history log. Then wait for some preconfigured time stamp of 10 sec, to ensure that all the in-flight transactions have taken place. As a second step, poll the data up to the maximum time from history log. Any latest record is polled in the next time. For a previous case, the application of solution is as follows. Compute maximum time stamp, Max time stamp=T2, Wait for 10 sec, Changes by user U1 are tabulated as follows:

| Time | Entity |
|------|--------|
| T1 | E1 |
| T2 | E2 |

Where T1<T2.
Further by reading the data from history up to T2, all the changes are polled.

FIG. 1 illustrates a flowchart indicating a method for polling and processing data. The method comprises computing a maximum time from a source after a last update time (101). The polling process is initiated after a, preset waiting time to ensure that all the transactions with respect to a change in a data is completed (102). A plurality of changes is queried and fetched after an elapse of the preset waiting time since the last update time and up to the maximum time (103). A time window is generated such that the time interval of the time window is set between the waiting time and the computed maximum time (104). A list of changes occurred within the generated time window is collected (105), The collected list of changes are sent for processing (106). The processed data is updated at the destination (107). The time window comprises a time interval between the last update time and the maximum time.

According to an embodiment herein, the waiting period is a minimum period of time required between two successive polling processes and the preset waiting period is selected such that all transactions which are in flight at a time of a first query are completed.

According to embodiment herein, the method further comprises using an event based trigger and a scheduler based trigger to poll and synchronize a data from a source to a destination.

When a poll is active at the time of a scheduler based trigger, then the scheduler based trigger is skipped. When an event based trigger is received and no poll is active, then the event based trigger kicks off the polling process. When the poll is active, the event based trigger sets a flag indicating a need to repoll at the end of a poll. At the end of a poll, the repoll flag is checked for. When the repoll flag is set, then another poll cycle is immediately kicked off.

Figure 2:
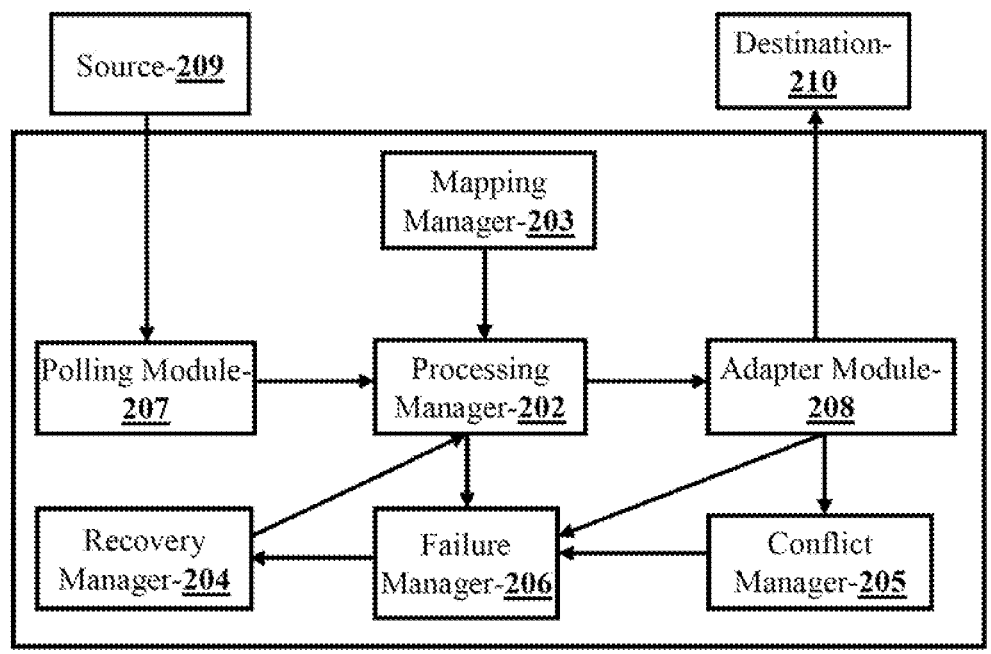
FIG. 2 illustrates a block circuit diagram of a system for polling and processing a data from a source system to a destination system, according to an embodiment herein.

FIG. 2 illustrates a block circuit diagram of a system for polling and processing data. As shown in FIG. 2, the system comprises a connector framework, a processing manager 202, a mapping manager 203, a recovery manager 204, a conflict manager 205 and a failure manager 206. The connector framework comprises two connector modules, a polling module 207 and an adopter module 208. The polling module 207 reads the plurality of changes from the source 209 and the adapter module writes the plurality of changes at the destination 210.

The processing manager 202 processes a poll event using a processing engine. The processing engine is any one of but not limited to a Java Process Definition Language (JBOSS JPDL), Drools and an Apache Orchestration Director Engine (ODE). The processing manager 202 further reports a successful synchronization process back to the source 209 after a completion of a successful synchronization process. After an unsuccessful synchronization process the processing manager passes 202 a control to a failure manager 206.

The mapping manager 203 maps a plurality of fields of the source 209 to corresponding fields of a destination.

The recovery manager 204 automatically recovers a data in case of an unexpected failure. The recovery manager 204 further controls the adapter module 208 and the polling module 207.

The conflict manager 205 solves one or more conflicts occurring during a synchronization process. A conflict is occurred, when a current value of any field of the destination does not match with a last value of a field of the source 209.

The failure manager 206 controls a failed event during a synchronization process. The failed event is the one in which a change in a data is not written to the destination 210.

The conflict manager 207 detects a conflict to activate an integration model to resolve the conflict automatically. The integration model is at least one of but not limited to a master/slave model, a partitioned ownership model, a dynamic ownership model, a peer to peer model and a custom configuration model. In the master/slave model, the entity is created at the master and one or more read only copies of the entity are created in slave system. In the partitioned ownership model, one or more fields of the entity are created at one or more systems. In the dynamic ownership model, an ownership of the entity changes dynamically in the dynamic ownership model. In the peer to peer to model, changes are made to the entities from a plurality of sites to carry out a conflict detection process and a conflict resolving process. In the custom configuration model, a replication model is customized.

Figure 3:
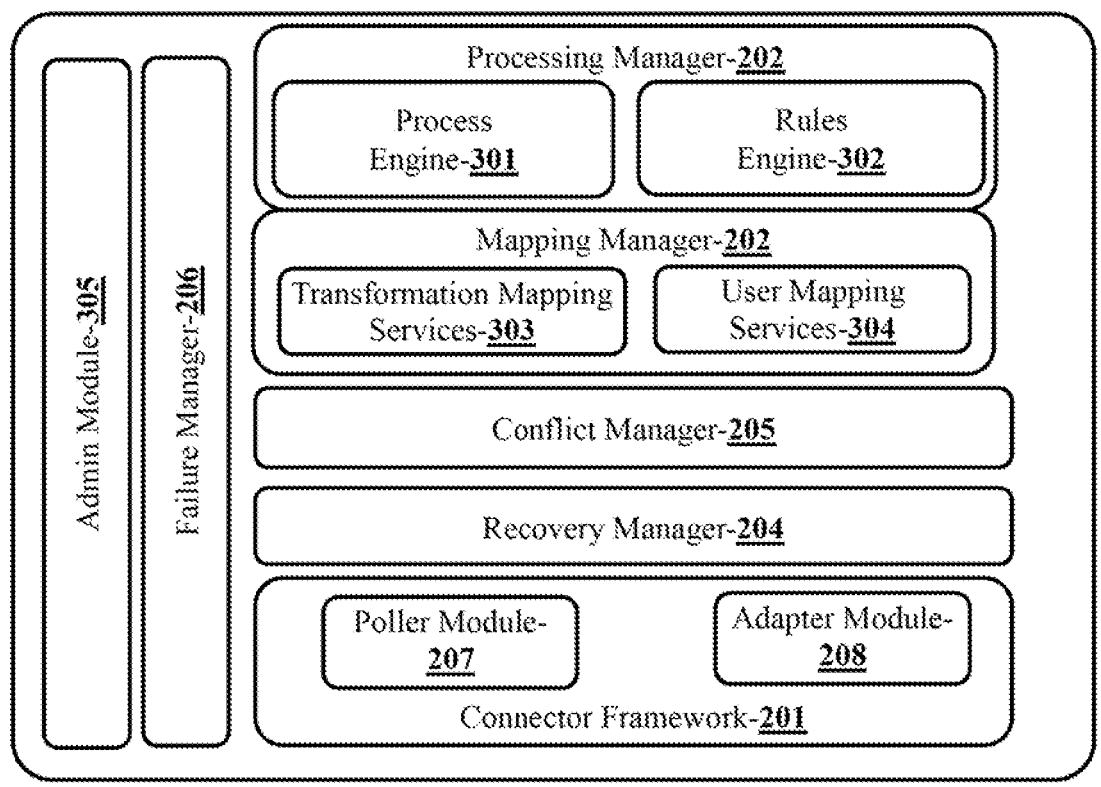
FIG. 3 illustrates a functional block diagram of a system for polling and processing a data system to a destination system, according to an embodiment herein.

FIG. 3 illustrates a functional block diagram of a system for polling and processing a data and to synchronize a data from a source to a destination. An Integration Manager (IM) framework based on. Enterprise Service Bus (ESB) principle is a key component of the architecture. The architecture is based on a hub and spoke topology. According to FIG. 3, the system comprises a connector framework 201 and connectors. The connector framework 201 is further provided with two sub modules such as a polling module 207 and an adapter module 208. The polling module 207 is responsible for reading the data changes from the source and adapter module 208 is responsible for writing the data to the destination.

The system includes a processing manager 201 responsible for processing a poll event. The processing manager 201 uses processing engine 301 for processing the data. The processing engine 301 is one of but not limited to JBOSS JPDL & Drools, Apache ODE. The rule engine 302 executes one or more business rules in a runtime production environment. The rules might come from a legal regulation, company policy or other sources. The rule engine 302 enables the company policies and other operational decisions to be defined, tested, executed and maintained separately. The processing manager 202 takes an action on a success or failure of a synchronizing process of the event. In general on completion of a successful synchronization process, the processing manager 202 notifies the source regarding the successful synchronization of an event or entity at the destination and adds the destination link of the event.

After a failure of the synchronization process, the processing manager 202 passes the failure report to a failure manager 206. The failure manager 206 controls the entire failed event during a synchronization process. The failed events are those in which a writing of changes to destination system is failed. OIM catch those events and create a failure queue. A synchronization process is retried repeatedly for a preset number of attempts after an unsuccessful synchronization process. The entire failed events can be notified and can be processed after human intervention.

The architecture further comprises a mapping manager 202 which is responsible for mapping different fields of the source system to corresponding field of the destination. A transformation mapping services 303 or the mapping manager 202 provides a transformation of one field in the source to a corresponding field in the destination. The user mapping services 304 maps a portal user ID to the user ID of synchronization system.

In case of system failure or any unexpected failures a recovery manager 204 automatically recovers the data. The recovery manager 204 controls both adapter module 208 and polling module 207. A new connector such as polling module 207 or an adapter module 208 does not need any kind of configuration or coding.

The conflict Manager 205 solves all the conflicts occurring during a synchronization process. A conflict occurs when the current value of any field of destination does not match with last value of the source field. The conflict manager 205 detects a conflict and also gives a plurality of integration models to resolve the conflict automatically. The integration model is at least one but not limited to a Master/Slave model, a partitioned ownership model, a dynamic ownership model, a peer to peer model and a custom configuration model.

In the Master/Slave model, an entity is mastered at one source and read only copies of the entities are created in other development systems. All changes to the entities must be made in the master. In the partitioned ownership model, different fields of the entity are mastered at different systems. In the dynamic ownership model, the entity ownership changes dynamically, but there is only one owner at any time. The current owner is indicated based on a value of a field in the entity. Only the current owner can pass the ownership to someone else. In the peer to peer model, the changes to the entities can be made from multiple sites. The peer to peer model typically performs a conflict detection process and a conflict resolution process. In the custom configuration model, the actual replication model is custom defined and typically it is a mixture of combination of the previous models.

The embodiments herein provide a method and system for polling and processing data. The described two steps polling algorithm for resolving passing in night problem is a novel way to ensure that all the transition happened within a time window are read and processed. The embodiments herein provide a method for polling and processing data in real time. This solution can be applied for any data integration problem, where concurrent changes can leads to passing in night problem.

Using the proposed method and system, one can easily create Multi-Point interconnections. The embodiments herein use the established connectors to connect the appropriate systems. The embodiments herein are further used to create and manage custom mappings. The method and system provides a built in support for a recovery management, a conflict detection and management, and a failure management. A support for pre and post commit event handling is provided. The installation, a support and maintenance of the synchronization solution is very simple.

One of the major advantages of the hub and spoke topology is that it decouples the source and destination by inserting a central component acting as an active mediator. The extension of the system implementing a hub and spoke architecture is also very flexible as compared with a point to point integration. The central component acting as a hub can be reused while adding the extra spokes to the system. The architecture also reduces the number of interfaces needed to build and maintain the system. Since all the components are loosely coupled, in IM architecture, it is easy to switch to the processing engine. A recovery manager of the proposed system guarantees "NO LOSS DATA" model.

The embodiments herein ensure that the information in multiple systems is consistent across the systems. The solution can be useful for distributed and non-compatible system integration process. The embodiments provide a common gateway for accessing a non legacy system. Using the proposed techniques, the legacy system can be a front-end cluster of applications, providing the user with a single interface, the legacy system and enables the user to work with other systems. The solution fetches the event from a source and writes the event to a destination separately. It allows a space between a read and write operations. Hence a processing of event can be qualified by some business logic. Thus it provides a policy or business based integration.

The main objective of IM is to integrate the engineering systems and build an automated and transparent engineering ecosystem with full traceability. A current version of IM supports a bidirectional integration between the systems like Defect Tracking Systems (Jira, Bugzilla etc), Software Quality Management System (HP Quality Center), Product Management System (Rational Doors, Microsoft TFS etc), Application Management system (ALMComplete etc). The techniques can be used in IT industry like ALM integration, SCM integration or non-it industry like Telecom for ERP integration. The common usage in IT industry is a policy based source code management with defect system.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A computer implemented method comprising instructions stored on a non-transitory computer readable storage medium and run on a computing system comprising a hardware processor and memory for polling and processing a data from a source system to a destination system, wherein the method comprises:
   processing a poll event with a processing manager using a processing engine;
   mapping a plurality of fields of a source system to corresponding fields of a destination, system with a mapping manager module;
   recovering a data automatically in ease of an unexpected failure with a recovery manager;
   solving one or more conflicts occurring during a synchronization process with a conflict manager and wherein a conflict is deemed to have occurred when a current value of any field of the destination system does not match with a last value of a field of the source system;

controlling a failed event during the synchronization process with a failure manager and wherein the failed event is the one in which a change in a data is not written to the destination system;

reading a plurality of changes from the source system with a polling module;

writing the plurality of changes at the destination system with an adapter module;

computing a maximum time from the source system after a last update time with the processing manager;

wherein the polling module waits for a preset waiting time to ensure that all transactions with respect to a change in data are completed at the destination system, and wherein the polling module queries and fetches a plurality of changes after an elapse of the preset waiting time since the last update time and up to the computed maximum time and wherein the preset waiting period is a minimum period of time required between two successive polling processes and wherein the preset waiting time is selected such that all transactions which are in flight at a time of a first query are completed, and wherein the polling module executes a two steps polling algorithm for resolving a passing in night problem to ensure that all the transition happened within a time window are read and processed.

2. The method of claim 1, wherein the processing engine is anyone of a Java Process Definition Language (JBOSS JPDL), Drools and an Apache Orchestration Director Engine (ODE).

3. The method of claim 1, wherein the processing manager is configured to report a successful synchronization process back to the source system after a completion of a successful synchronization process.

4. The method of claim 1, wherein the processing manager is configured to pass a control to a failure manager after an unsuccessful synchronization process.

5. The method of claim 1, wherein the recovery manager is configured to control the adapter module and the polling module.

6. The method of claim 1, wherein the conflict manager is configured to detect a conflict to activate an integration model to resolve the conflict automatically.

7. The method of claim 6, wherein the integration model is at least one of a master/slave model, a partitioned ownership model, a dynamic ownership model, a peer to peer model and a custom configuration model and wherein an entity is created at the master system and wherein one or more read only copies of the entity are created in a slave system in the master/slave model and wherein one or more fields of the entity are created at one or more systems in the partitioned ownership model, and wherein an ownership of the entity changes dynamically in the dynamic ownership model, and wherein changes are made to the entity from a plurality of sites to carry out a conflict detection process and a conflict resolving process in the peer to peer model, and wherein a replication model is customized using the custom configuration model.

8. The method of claim 1, further comprises an event based trigger and a scheduler based trigger to synchronize a data from the source system to the destination system, and wherein the scheduler based trigger is skipped, when a poll is active at the time of a scheduler based trigger, and, wherein the event based trigger kicks off the polling process, when an event based trigger is received and no poll is active and the event based trigger sets a flag indicating a need to report at the end of a poll, when the poll is active.

9. The method of claim 8, wherein the polling module is configured to check for a repoll flag at the end of a poll, and wherein the polling module is configured to kick off another poll cycle, when the re poll tag is set.

10. The method of claim 1, wherein the processing manager is configured to generate a time window such that a time interval of the time window is set between the waiting time and the computed maximum time, wherein the polling module is configured to collect a list of changes occurred within the generated time window, and wherein the module is configured to send the collected list of changes for processing, and wherein the time window comprises a time interval between the last update time and the maximum time.

11. The method of claim 1, wherein the adapter module is configured to updates the processed data at the destination system.

* * * * *